United States Patent
Liu et al.

(10) Patent No.: US 10,811,942 B2
(45) Date of Patent: Oct. 20, 2020

(54) ROTATING ELECTRICAL MACHINE AND CORRESPONDING METHOD

(71) Applicant: ABB Schweiz AG, Baden (CH)

(72) Inventors: Yujing Liu, Vasteras (SE); Pierluigi Tenca, Genoa (IT)

(73) Assignee: ABB Schweiz AG, Baden (CH)

(*) Notice: Subject to any disclaimer, the term of this patent is extended or adjusted under 35 U.S.C. 154(b) by 1109 days.

(21) Appl. No.: 13/892,715

(22) Filed: May 13, 2013

(65) Prior Publication Data

US 2013/0241368 A1  Sep. 19, 2013

Related U.S. Application Data

(63) Continuation of application No. PCT/EP2010/067374, filed on Nov. 12, 2010.

(51) Int. Cl.
  *H02K 11/33* (2016.01)
  *H02P 6/08* (2016.01)

(52) U.S. Cl.
  CPC .............. *H02K 11/33* (2016.01); *H02P 6/085* (2013.01)

(58) Field of Classification Search
  CPC .. H02K 11/00; H02K 11/001; H02K 11/0068; H02K 11/0073; H02K 11/04; H02K 17/30; H02M 7/5387; H02P 27/04; H02P 7/0044; H02P 6/008; H02P 6/085
  USPC ....... 310/71, 68 D; 318/51, 53, 400.29, 700, 318/280, 293, 294, 400.27, 400.28; 363/71; 336/115, 117, 130, 131
  See application file for complete search history.

(56) References Cited

U.S. PATENT DOCUMENTS

| | | | | |
|---|---|---|---|---|
| 4,804,895 A | * | 2/1989 | Miskin | G01R 19/25 388/809 |
| 4,864,483 A | * | 9/1989 | Divan | H02M 5/4585 363/132 |
| 5,153,453 A | * | 10/1992 | Walters | G05F 3/18 327/502 |
| 5,166,617 A | * | 11/1992 | Ni | G01R 33/3628 324/318 |
| 5,237,255 A | * | 8/1993 | Klatt | H02P 25/024 318/732 |
| 5,311,136 A | * | 5/1994 | Takahashi | G01R 33/3852 324/318 |
| 5,912,522 A | | 6/1999 | Rivera | |

(Continued)

FOREIGN PATENT DOCUMENTS

| | | |
|---|---|---|
| CN | 1808862 A | 7/2006 |
| CN | 201081845 Y | 7/2008 |

(Continued)

OTHER PUBLICATIONS

Kern (DE 102005027166) English Translation.*

(Continued)

*Primary Examiner* — Tulsidas C Patel
*Assistant Examiner* — Robert E Mates
(74) *Attorney, Agent, or Firm* — Whitmyer IP Group LLC (57) ABSTRACT

A rotating electrical machine including a stator or rotor including a plurality of serially connected switching cells. Each switching cell includes a winding subsection and a current reverser arranged to controllably alter a current direction through the winding subsection, and each current reverser includes a capacitor arranged to form a resonant circuit in cooperation with the winding subsection.

20 Claims, 5 Drawing Sheets

(56) References Cited

U.S. PATENT DOCUMENTS

| | | | | |
|---|---|---|---|---|
| 5,917,295 | A * | 6/1999 | Mongeau | H02P 27/08 318/290 |
| 6,028,760 | A | 2/2000 | Ferreira | |
| 6,054,791 | A * | 4/2000 | Lander | G05B 19/231 310/233 |
| 6,064,175 | A * | 5/2000 | Lee | H02P 6/085 318/254.2 |
| 6,388,357 | B1 * | 5/2002 | Tokumasu | H02K 3/28 310/198 |
| 6,762,520 | B1 * | 7/2004 | Ehrhart | H02K 1/20 310/208 |
| 7,102,901 | B2 * | 9/2006 | Falk | B60L 9/24 363/37 |
| 7,180,212 | B2 * | 2/2007 | Anwar | H02P 25/18 310/68 R |
| 7,592,764 | B2 | 9/2009 | Vermeir et al. | |
| 2002/0125855 | A1 | 9/2002 | Johnson | |
| 2004/0021437 | A1 * | 2/2004 | Maslov | B60L 8/00 318/400.01 |
| 2006/0038517 | A1 * | 2/2006 | MacKay | H02P 8/34 318/685 |
| 2006/0114642 | A1 * | 6/2006 | Liu | C25B 1/04 361/500 |
| 2007/0018524 | A1 * | 1/2007 | Yonemori | H02K 21/24 310/178 |
| 2007/0146958 | A1 | 6/2007 | Babcock et al. | |
| 2008/0272115 | A1 * | 11/2008 | Suenaga | H05B 6/666 219/702 |
| 2009/0200885 | A1 * | 8/2009 | Kikuchi | B22F 1/02 310/156.78 |

FOREIGN PATENT DOCUMENTS

| | | | |
|---|---|---|---|
| DE | 102005027166 A1 * | 12/2006 | H02M 1/34 |
| EP | 1226994 A2 | 7/2002 | |
| JP | 2001211690 A | 8/2001 | |
| WO | 2006100420 A1 | 9/2006 | |
| WO | 2007054909 A2 | 5/2007 | |

OTHER PUBLICATIONS

International Preliminary Report on Patentability Application No. PCT/EP2010/067374 Completed: Oct. 10, 2012 13 pages.

International Search Report and Written Opinion of the International Searching Authority Application No. PCT/EP2010/067374 Completed: Jul. 6, 2011; Mailing Date: Jul. 17, 2011 12 pages.

Written Opinion of the International Preliminary Examining Authority Applicaton No. PCT/EP2010/067374 dated Jun. 22, 2012 5 pages.

Lambertz, Lukas, et al., "Modular converter systems for vehicle applications", XP031835669, Emobility—Electrical Power Train, 2010, Nov. 8, 2010 IEEE, Piscataway, NJ, USA, pp. 1-6.

* cited by examiner

ROTATING ELECTRICAL MACHINE AND CORRESPONDING METHOD

FIELD OF THE INVENTION

The invention relates to a rotating electrical machine and method for altering a current flowing in windings of such a rotating electrical machine.

BACKGROUND OF THE INVENTION

Currently, the market for the high power, medium voltage drive has been dominated by the AC (Alternating Current) drives, where the multi-level topology is used to produce the near-sinusoidal waveforms. DC (Direct Current) machines and synchronous machines are starting to increase in popularity as it provides other advantages.

WO2006/100420 A1 presents an electrical machine such as a brushless dc rotating or linear machine. The electrical machine includes a first electronic commutator and a first stator winding including a number of coils linked by the same number of points of common coupling, each point of common coupling being connected to the first electronic commutator. The electrical machine also includes a second electronic commutator and a second stator winding including a number of coils linked by the same number of points of common coupling, each point of common coupling being connected to the second electronic commutator. The dc terminals of the first and second electronic commutators can be connected together in a series, parallel or series-parallel arrangement.

However, altering current directions in the coils of such machines introduces losses which would benefit from being reduced.

EP1226994 discloses an energy supply for rail vehicles. The energy supply comprises a plurality of serially connected primary converter sections on one side of a transformer. The primary converter sections comprise resonant circuits in order to reduce losses when converting the high ac input voltage into dc output voltage.

US2002/0125855 discloses an electric drive system for an electrical motor to generate varying amounts of output torque supplied to a driven member over a wide range of constant revolutions per minute speeds. The stator winding of the electrical motor according to US2002/0125855 is divided into a plurality of winding subsections.

SUMMARY OF THE INVENTION

An object of the invention is to reduce losses when altering current direction in cells of windings in a rotating electrical machine.

A first embodiment is a rotating electrical machine comprising a stator or rotor comprising a plurality of serially connected switching cells. Each switching cell comprises a winding subsection and a current reverser arranged to controllably alter a current direction of source current through the winding subsection, and each current reverser comprises a capacitor arranged to form a resonant circuit in cooperation with the winding subsection.

Through the addition of the capacitor, a resonant LC circuit can be formed together with the winding subsection. When timing is used correctly, the current altering is achieved with greater efficiency when compared to what is known in the prior art, since it is the natural oscillation of voltages and currents of the resonant LC circuit which provokes the alteration of the current flowing through winding subsection 22.

The stator or rotor may comprise a plurality of in parallel connected branches, each branch comprising a plurality of serially connected switching cells. By arranging several branches of switching cells, the machine is capable of accepting a larger current, whereby the machine achieves a higher power.

A source of the current through the winding subsection may be a DC source.

At least one of the switching cells may comprise a plurality of winding subsections and the capacitor may be connected in parallel with the winding subsections of the switching cells.

The capacitor of each current reverser may be connected in parallel with the respective winding subsection.

The switching cells may be provided in the stator or the switching cells may be provided in the rotor or in both the rotor and stator.

Each current reverser may comprise a plurality of capacitors arranged to form part of the resonant circuit.

Each current reverser may comprise a first leg comprising two switches arranged serially between a positive and negative terminal of the current reverser, and a second leg comprising two switches arranged serially between the positive and negative terminal of the current reverser, wherein the resonant circuit is arranged between a first point being between the two switches of the first leg and a second point being between the two switches of the second leg.

Each current reverser may be arranged to alter the current through the winding subsection when a back electromotive force, back-EMF, of the respective switching cell is determined to be lower than a threshold value. Since switching losses of a semiconductor device depend on the multiplication of the voltage over it and the current through it in the duration of the switching, a near zero voltage implies negligible switching losses.

The capacitor of each switching cell may be selected such that at least one time constant of the resonant circuit is suitable for a desired switching schedule of the respective switching cell.

Each switching cell may comprise a switch to allow disconnection of the capacitor from the winding subsection. A first advantage of such an arrangement is that the resonant circuit in the steady state can be a normal circuit without any connected capacitors, thereby reducing the circuit complexity and reducing a risk for additional resonance. A second advantage is that the capacitor can be switched into the circuit with zero (or near zero) initial voltage and then switched out of the circuit again without any voltage in the capacitor, further reducing losses.

Each switching cell may further comprise one switch on each side of the capacitor to allow disconnection of the capacitor from the winding subsection.

The rotating electrical machine may be a synchronous electrical machine.

The DC source may be a controllable current source.

The winding subsections of the serially connected switching cells may together constitute a winding of the rotating electrical machine.

A second embodiment is a method of producing a rotating electrical machine comprising the steps of: providing a plurality of switching cells, each comprising a winding subsection, a current reverser arranged to controllably reverse a current direction through the winding subsection, and a capacitor arranged to form a resonant circuit in cooperation with the winding subsection; and providing a stator comprising the plurality of serially connected switching cells.

It is to be noted that any feature of the first and second embodiments may, where appropriate, be applied to each other.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION OF THE INVENTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
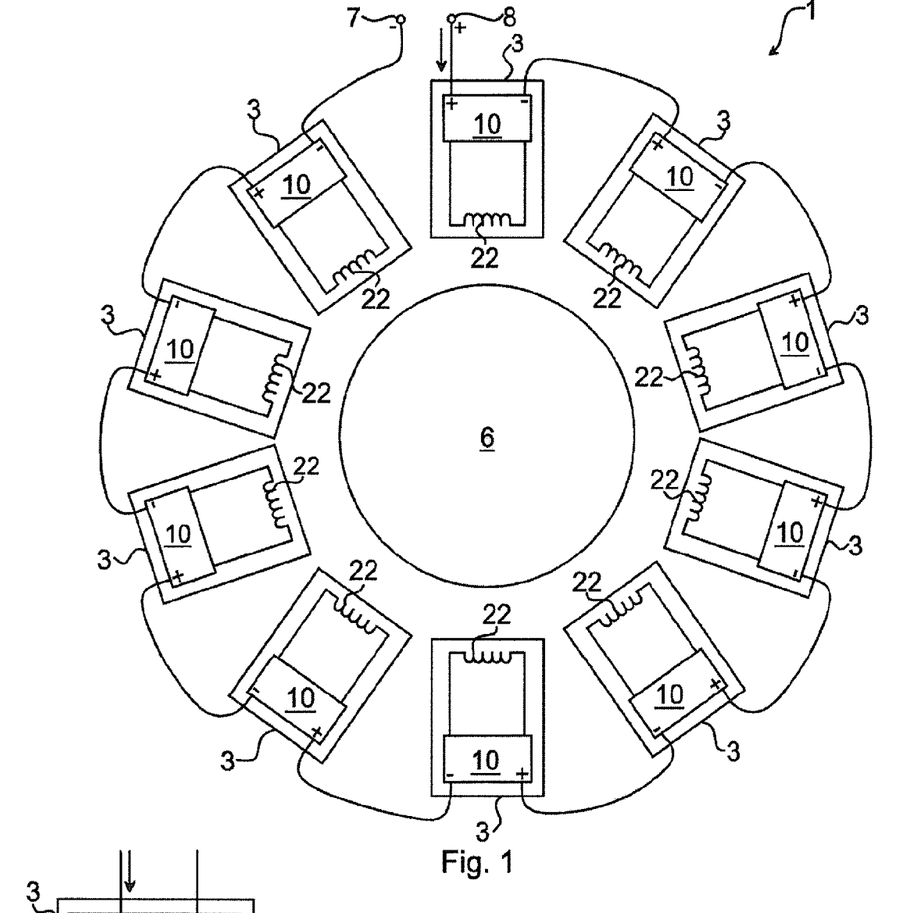
FIG. 1 is a schematic diagram of an electrical machine in one embodiment.

A rotating electrical machine 1, such as a synchronous electrical machine, comprises a stator and a rotor 6. In the case that the rotating electrical machine is a synchronous electrical machine, the machine can be of permanent magnet or electrical excitation type. Examples of permanent magnets that can be used are NdFeB or ferrite, or based on alloys of Cobalt (Co). The rotating electrical machine 1 can be a motor or generator, or a machine functioning as either depending on how it is operated. The stator comprises a number of switching cells 3. Each switching cell 3 comprises a winding subsection 22 and a current reverser 10. The current reverser 10 is arranged to receive a DC input on a positive and negative terminal and to supply a current in either direction through the winding subsection 22. In other words, using an input of unchanged polarity, the current reverser supplies a DC current of either polarity to the connected winding subsection 22. The current reverser 10 can be provided integrated physically in the rotating electrical machine 1 or attached to a body of the rotating electrical machine 1 or be part of an independent converter connected to the rotating electrical machine 1 using suitable cables.

During operation, the current reversers 10 change polarity of the currents in the winding subsections 22 connected to them in sequential order. The overall combined effect of all properly sequenced current reversals in the winding subsections 22 leads to a time varying magnetic field that causes the rotor 6 to rotate. Differently from most pulse width modulations (PWM), the switching patterns in all switching cells 3 can avoid the need of frequent commutations, since sinusoidal currents in the winding subsections 22 are not necessary here. Such currents can for example be square waves. The switching can be performed as square wave switching. In other words, pulse width modulation (PWM), to achieve sinusoidal current through the winding subsection 22 is not necessary.

The switching cells 3 are connected serially, whereby a total voltage of the DC source connected to terminals 7, 8 is divided between the switching cells 3, and thereby, essentially between the winding subsections 22. By using these serially connected switching cells 3, the electrical rotating machine 1 can be configured for high voltage and high power applications, such as 20 megawatts or more. In other words, a higher rating is achieved by providing a greater number of switching cells 3 in this serial configuration. Furthermore, branches connected in parallel can be configured to increase power rating.

The DC source can be provided using rectifiers which in turn are connected to an AC source. Control of the motor, i.e. control of torque, velocity, position etc. can be achieved by controlling the rectifier to supply appropriate current and/or voltage to the rotating electrical machine 1. The DC source is in one embodiment a current source, which provides a more direct torque control of the rotating electrical machine 1.

Together, all winding subsections 22 may optionally constitute the stator winding of the rotating electrical machine 1.

Figure 2A:
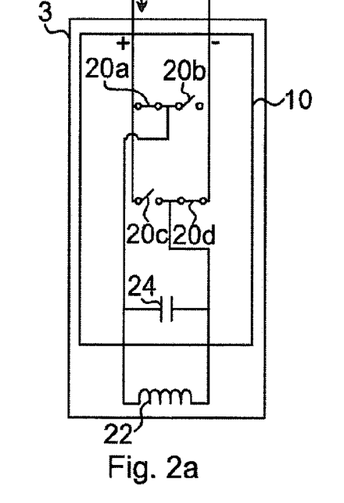
FIGS. 2A and 2B are schematic circuit diagrams of a switching cell of FIG. 1 in two different drawing layouts.
Figure 2B:
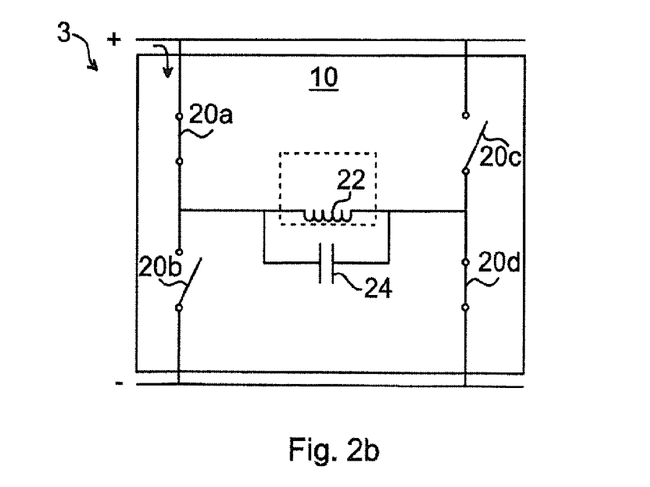

FIGS. 2A and 2B are schematic circuit diagrams of a switching cell of FIG. 1 in two different drawing layouts. In other words, the circuit diagrams of FIGS. 2A and 2B are equivalent, where the layout of FIG. 2A is more appropriate to display the correspondence with FIG. 1 and the layout of FIG. 2B is more appropriate for explaining the operation of the switching cell.

The current reverser 10 comprises four switches 20a-d which, in operation, can alter the current direction through the winding subsection 22. In other words, the current reverser 10 is capable of changing the sign of that current. In fact, which is clear from the layout of in FIG. 2B, the switches 20a-d are arranged in an H bridge. A capacitor 24 is provided in parallel to the winding subsection 22 in a center of the H bridge to make the current reversing more efficient using an electrical resonance phenomenon from the resulting resonant circuit, as will be explained in more detail below. Alternatively, a plurality of capacitors can be arranged to form a capacitor assembly which is functionally equivalent with a single capacitor but may provide advantages of capacity and/or redundancy.

The switches are of any type suitable for the purpose, e.g. insulated gate bipolar transistors (IGBTs), IGBTs with serially connected diodes, thyristors, Reverse Blocking IGBT (RB-IGBT), Integrated Gate-Commutated Thyristor IGCTs, Reverse Blocking IGCT (RB-IGCT), or any combination of these.

In FIGS. 2A and 2B, a state of the switching cell is shown where the DC current flows through the switch 20a, the winding subsection 22 and the switch 20d. The switches 20c and 20b are open (disconnected). If instead the switches 20c and 20b were to be closed (connected) and the switches 20a and 20d were to be open, it is evident that the DC current would still flow through the winding subsection 22, but in the opposite direction. It will be shown below with reference to FIGS. 4A-F and FIGS. 5A-F in more detail how this switching is performed.

Figure 3:
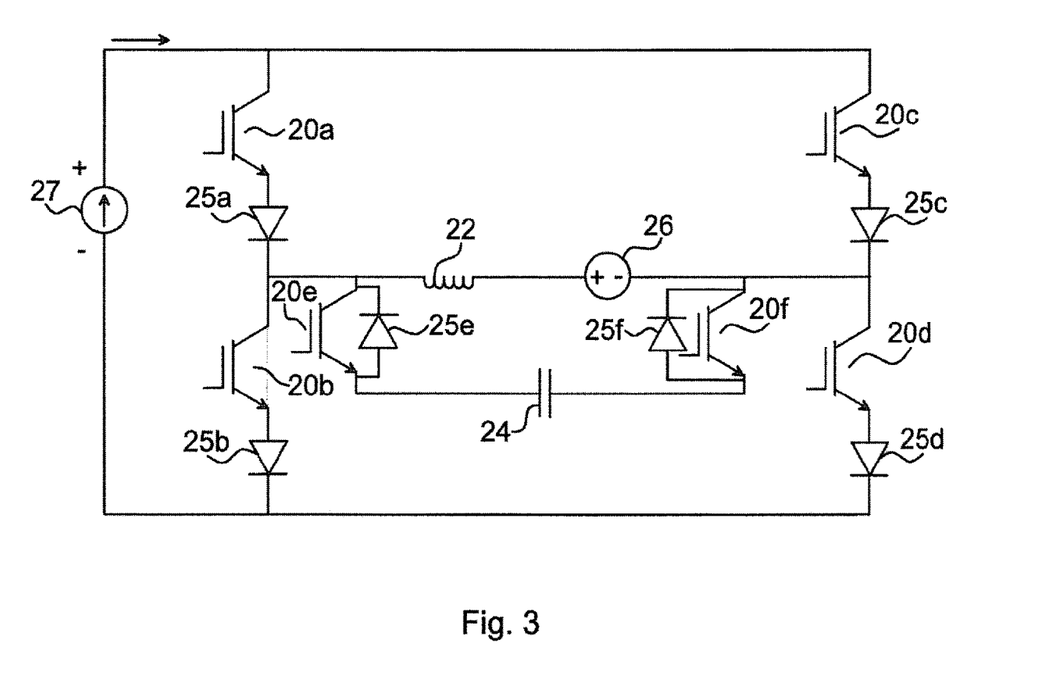
FIG. 3 is a more detailed circuit diagram of a switching cell of FIG. 1.

FIG. 3 is a more detailed circuit diagram of a switching cell of FIG. 1. Here, the switches 20a-d are shown as IGBTs. Furthermore, each switch 20a-d has a respective diode 25a-d, which can be considered to be part of a switch assembly. The function of the diode is to assure that the voltage across the switch can assume both signs, thereby implementing a fully controllable bidirectional voltage blocking, unidirectional current carrying switch.

A fifth switch 20e and a sixth switch 20f are provided to allow disconnection of the capacitor 24 from the current through the winding subsection 22, the operation of which will be explained in more detail below with reference to FIGS. 5A-5F. Anti parallel to each of the switches 20e-f, a respective diode 25e-f is provided to allow the flow of a current when both switches are closed. Alternatively, only one of the fifth or sixth switch 20e-f is provided to perform the same function. Furthermore, the circuit diagram comprises a representation of the back electromotive force, back-EMF 26, which is used for determining when to switch current of the current reverser 10.

As is known in the art per se, resistances representing losses or actual resistance components can be added to render the model more complete or the circuit more functional. The ideas presented herein are still applicable to such embodiments.

FIGS. 4A-4F are schematic circuit diagrams of different sequential states in a switch of current direction in one embodiment of a switching cell 3 of FIG. 1.

Figure 4A:
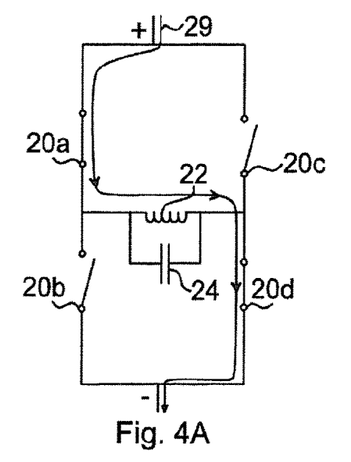
FIGS. 4A-4F are schematic circuit diagrams of different sequential states in a switch of current direction in one embodiment of a switching cell of FIG. 1.

FIG. 4A shows a first state of the current reverser when a current 29 is flowing through the switch 20a, the winding subsection 22 and the switch 20d. This is a steady state where switches 20b and 20c are open. When the back-EMF (as shown in FIG. 3) is determined to be lower than a threshold value, it is determined to start the switching sequence to reverse the direction through the winding subsection 22. The following states in the sequence will be shown in FIGS. 4B-E.

Figure 4B:
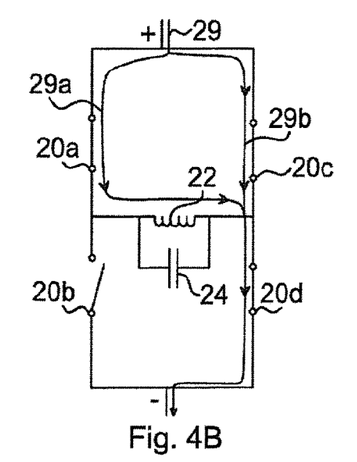

In a second state of the current reverser shown in FIG. 4B, the switch 20c is closed, whereby the current 29 is divided into a first current 29a through the winding subsection and a second current 29b through the switch 20c. Due to the inductance of the winding subsection 22, energy stored in the magnetic field of the winding subsection 22 continues to force the first current 29a. The first current 29a thus dominates initially but will reduce with time while the second current 29b will increase with time. The time in the second state is sufficiently long to allow the switch 20c to close properly.

Figure 4C:
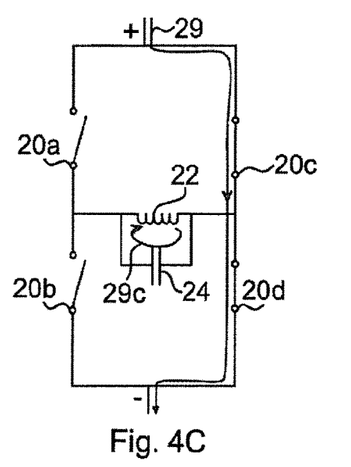

In a third state of the current reverser shown in FIG. 4C, the switch 20a is opened, whereby all current 29 of the DC source is led through the switches 20c and 20d. The current 29c continues to flow in the winding subsection 22 and now also flows to the capacitor 24.

Figure 4D:
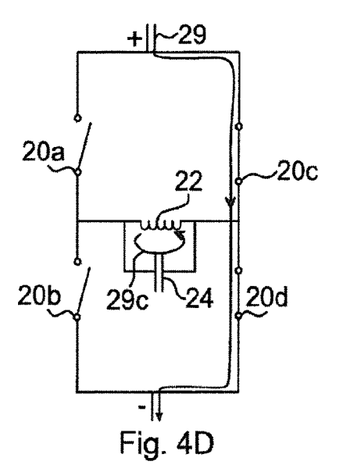

In a fourth state of the current reverser shown in FIG. 4D, the switches have not changed from the third state, but sufficient time has now passed whereby the resonant circuit, formed by the winding subsection 22 and the capacitor 24, has reversed its internal current 29c. Once the current 29c through the winding subsection 22 is at about at an extreme (maximum or minimum), the next state is assumed.

Figure 4E:
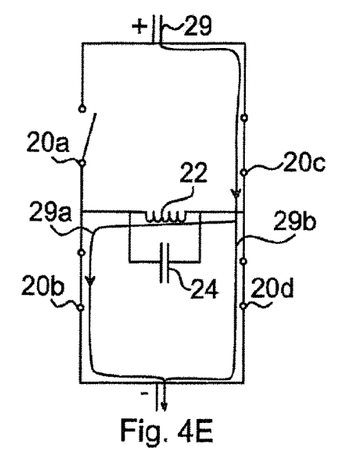

Now, in a fifth state of the current reverser 10 shown in FIG. 4E, the switch 20b is closed whereby the current 29 is divided into a first current 29a through the winding subsection 22 and a second current 29b through the switch 20d. The current through the winding subsection 22 has already been reversed in the resonant circuit, whereby very little energy has been required to effect the alteration of current direction through the winding subsection 22. The time in the fifth state is sufficiently long to allow the switch 20b to close properly.

Figure 4F:
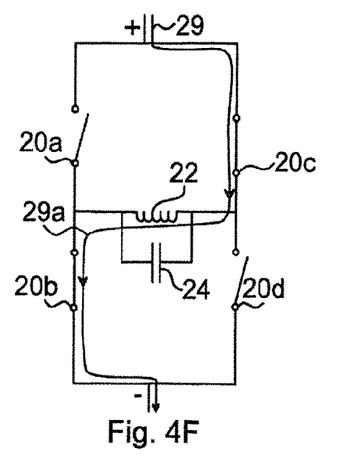

In a sixth state of the current reverser 10 shown in FIG. 4F, a new steady state is achieved where the switch 20d is open and all current 29 from the DC source flows through the switch 20c, the winding subsection 22 and the switch 20b.

To reverse the current again, the same method is applied but in reverse.

By introducing the capacitor 24 to achieve a resonant LC circuit, the current reversing is very efficient, since it is the natural oscillation of the passive components of the resonant LC circuit which effects the reversing of the current through the winding subsection 22, reducing losses. The capacitor 24 should be selected so that the resonance frequency of the resonant LC circuit allows the sequence of the switching stages to occur in a desired time frame according to a desired switching schedule.

FIGS. 5A-5F are schematic circuit diagrams of different sequential states in a switch of current direction in one embodiment of a switching cell of FIG. 1. FIGS. 5A-5F are equivalents of FIGS. 4A-4F, respectively.

The main difference is that in FIGS. 5A-5F the switching cell further comprises one switch 20e-f on each side of the capacitor 24 to allow disconnection of the capacitor 24 from the winding subsection 22.

Figure 5A:
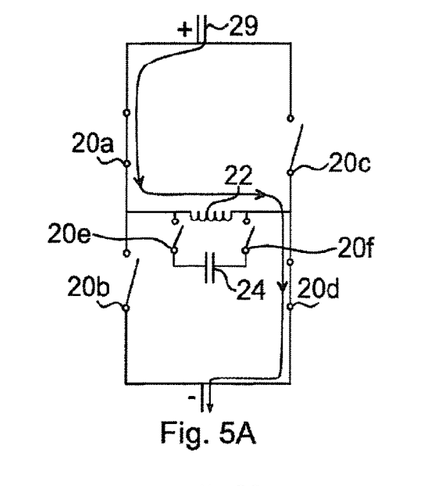
FIGS. 5A-5F are schematic circuit diagrams of different sequential states in a switch of current direction in one embodiment of a switching cell of FIG. 1 introducing disconnection of the capacitor.
Figure 5B:
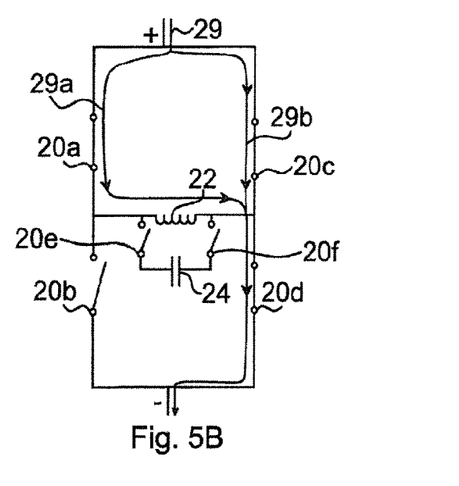
Figure 5C:
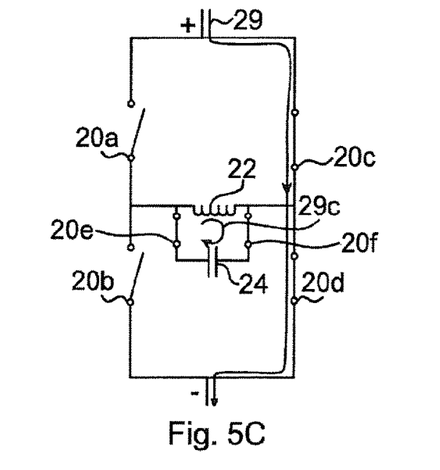
Figure 5D:
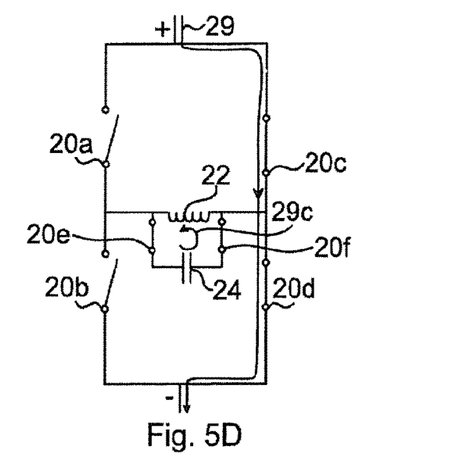
Figure 5E:
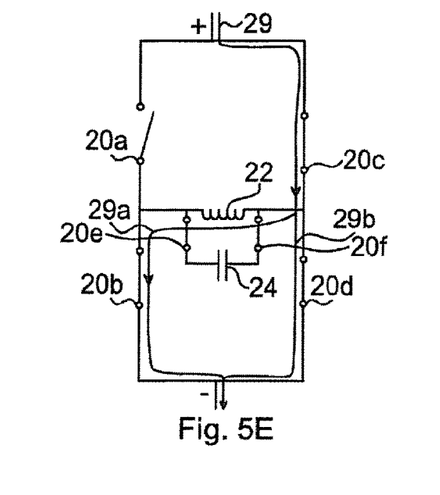
Figure 5F:
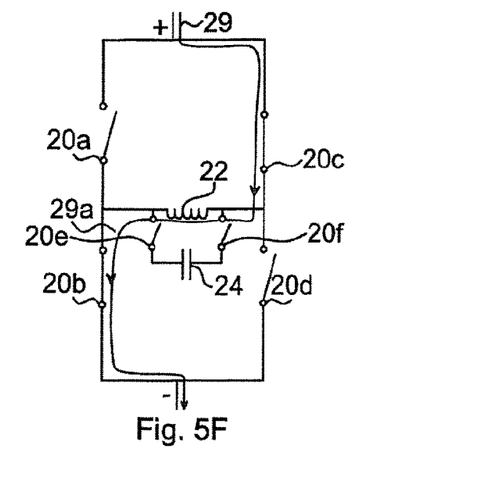

The capacitor 24 is disconnected from the rest of the circuit, except when the capacitor is used in the resonant circuit in states three and four of FIGS. 5C and 5D, respectively. While it is here presented to disconnect the capacitor using two switches arranged on either side, any arrangement allowing the capacitor to be disconnected can be used, e.g. one switch on one side or the capacitor, two switches on one side of the capacitor, etc.

A first advantage of such an arrangement is that the resonant circuit in the steady state can be a normal circuit without any connected capacitors, thereby reducing the circuit complexity and reducing a risk for additional resonances. A second advantage is that the capacitor can be switched into the circuit with zero (or near zero) initial voltage and then switched out of the circuit again without any voltage in the capacitor, further reducing losses.

Figure 6:
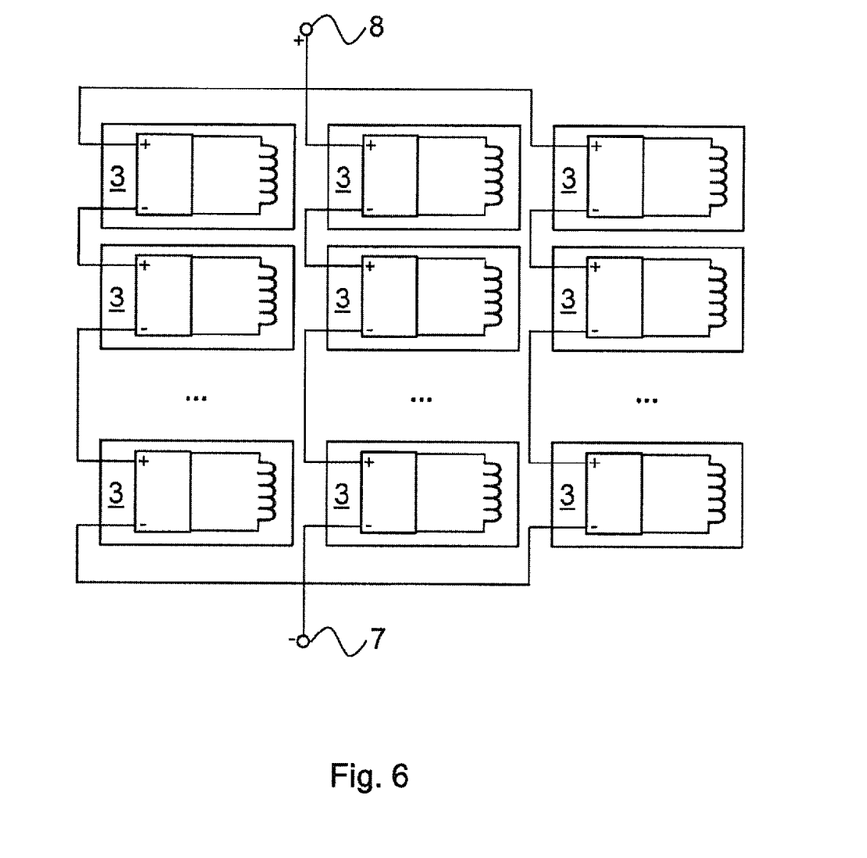
FIG. 6 is a schematic diagram of an embodiment with parallel paths of switching cells.

FIG. 6 is a schematic diagram of an embodiment with parallel branches of switching cells. As can be seen, the positive terminal is connected to three branches, where each branch comprises a plurality of serially connected switching cells 3. By arranging several branches of switching cells in parallel, the machine is capable of accepting a larger current, whereby the machine achieves a higher power.

While embodiments described herein are directed towards one phase, the same concepts can equally be applied to multiphase rotating electrical machines.

Furthermore, while it has been presented above a solution with switching cells in a stator, the concepts presented can equally well be applied to a rotor.

Also, while embodiments above involve the use of a DC source, the concepts of alteration of current direction presented herein can equally well be applied to AC sources.

It is to be noted that the rotating electrical machine can be operated in generator or motor operation mode, or switch between generator and motor mode without affecting the general concepts presented herein.

Also, while embodiments above involve the use of a rotating electrical machine, the concepts of alteration of current direction presented herein can equally well be applied to other electromechanical converters such as linear machines (linear motors/generators).

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A rotating or linear electrical machine comprising:
   a stator or rotor comprising a plurality of serially connected switching cells,
   wherein each switching cell comprises a winding subsection and a current reverser arranged to controllably alter a current direction through the winding subsection,
   wherein each current reverser comprises a capacitor arranged to form a resonant circuit in cooperation with the winding subsection, wherein each current reverser further comprises switch assemblies that provide bidirectional voltage blocking for changing the polarity of the voltage across the winding subsection, and
   wherein each switching cell comprises a switch configured to disconnect the capacitor from the winding subsection without stopping the flow of current through the winding subsection.

2. The rotating or linear electrical machine according to claim 1, wherein the stator or the rotor comprises a plurality of in parallel connected branches, each branch comprising a plurality of serially connected switching cells.

3. The rotating or linear electrical machine according to claim 1, wherein a source of current through the winding subsection is a DC source.

4. The rotating or linear electrical machine according to claim 1, wherein at least one of the switching cells comprise a plurality of winding subsections and the capacitor is connected in parallel with the winding subsections of the switching cells.

5. The rotating or linear electrical machine according to claim 1, wherein the capacitor of each current reverser is connected in parallel with the respective winding subsection.

6. The rotating or linear electrical machine according to claim 1, wherein the switching cells are provided in the stator.

7. The rotating or linear electrical machine according to claim 1, wherein the switching cells are provided in the rotor.

8. The rotating or linear electrical machine according to claim 1, wherein each current reverser comprises a plurality of capacitors arranged to form part of the resonant circuit.

9. The rotating or linear electrical machine according to claim 1, wherein each current reverser comprises a first leg comprising two switches arranged serially between a positive and negative terminal of the current reverser, and a second leg comprising two switches arranged serially between the positive and negative terminal of the current reverser, wherein the resonant circuit is arranged between a first point being between the two switches of the first leg and a second point being between the two switches of the second leg.

10. The rotating or linear electrical machine according to claim 1, wherein each current reverser is arranged to alter the current through the winding subsection when an absolute value of a back electromotive force of the respective switching cell is determined to be lower than a threshold value.

11. The rotating or linear electrical machine according to claim 1, wherein the capacitor of each switching cell is selected such that at least one time constant of the resonant circuit is suitable for a desired switching sequence of the respective switching cell.

12. The rotating or linear electrical machine according to claim 1, wherein for each switching cell,
    the resonant circuit in steady state is a circuit without the capacitor connected; and
    the capacitor is configured to be switched into the resonant circuit with substantially zero initial voltage and switched out of the resonant circuit without any voltage in the capacitor.

13. The rotating or linear electrical machine according to claim 1, wherein each switching cell further comprises one switch on each side of the capacitor to allow disconnection of the capacitor from the winding subsection.

14. The rotating or linear electrical machine according to claim 1, wherein the rotating electrical machine is a synchronous electrical machine.

15. The rotating or linear electrical machine according to claim 3, wherein the DC source is a constant current source.

16. The rotating or linear electrical machine according to claim 1, wherein the winding subsections of the serially connected switching cells together constitute a winding of the rotating electrical machine.

17. The rotating or linear electrical machine according to claim 1, wherein the current reversers of the switching cells change polarity of the currents in the winding subsections in sequential order.

18. The rotating or linear electrical machine according to claim 17, wherein the sequenced current reversers generate a time varying magnetic field.

19. The rotating or linear electrical machine according to claim 1, wherein, for each current reverser, the switch assemblies are arranged in an H bridge, and the capacitor and the corresponding winding subsection are connected in parallel in a center of the H bridge.

20. A rotating or linear electrical machine comprising:
    a stator or rotor having a plurality of serially connected switching cells,
    each switching cell having a winding subsection and a current reverser arranged to controllably alter a current direction through the winding subsection,
    each current reverser having a capacitor arranged to form a parallel resonant circuit in cooperation with the winding subsection,
    each current reverser having switch assemblies capable of bidirectional voltage blocking for changing the polarity of the voltage across the winding subsection, wherein for each current reverser, the switch assemblies are arranged in an H-bridge and the capacitor and the corresponding winding subsection are connected in parallel in a center of the H-bridge,
    wherein natural oscillation of voltages and currents of the parallel resonant circuit initiates the alteration of the direction of current flowing through the winding subsection when the switch assemblies are unchanged in state.

\* \* \* \* \*